United States Patent
Böttger

(10) Patent No.: US 12,467,890 B2
(45) Date of Patent: Nov. 11, 2025

(54) APPARATUS AND METHOD FOR DETERMINING A MATERIAL PROPERTY OF A TEST SPECIMEN IN A TEST SPECIMEN REGION NEAR THE SURFACE

(71) Applicant: AIM Systems GmbH, St. Ingbert (DE)

(72) Inventor: Stefan Böttger, St. Ingbert (DE)

(73) Assignee: AIM Systems GmbH, St. Ingbert (DE)

( * ) Notice: Subject to any disclaimer, the term of this patent is extended or adjusted under 35 U.S.C. 154(b) by 588 days.

(21) Appl. No.: 17/783,007

(22) PCT Filed: Dec. 14, 2020

(86) PCT No.: PCT/EP2020/085962
§ 371 (c)(1),
(2) Date: Jun. 7, 2022

(87) PCT Pub. No.: WO2021/116489
PCT Pub. Date: Jun. 17, 2021

(65) Prior Publication Data
US 2023/0028140 A1 Jan. 26, 2023

(30) Foreign Application Priority Data
Dec. 12, 2019 (LU) .................................. LU101529

(51) Int. Cl.
*G01N 25/18* (2006.01)
*G01N 21/17* (2006.01)
(Continued)

(52) U.S. Cl.
CPC ......... *G01N 25/18* (2013.01); *G01N 21/1717* (2013.01); *G01N 21/8806* (2013.01); *G01N 25/72* (2013.01)

(58) Field of Classification Search
CPC .... G01N 25/18; G01N 25/72; G01N 21/1717; G01N 21/88
(Continued)

(56) References Cited

U.S. PATENT DOCUMENTS 4,854,724 A * 8/1989 Adams .................... G01N 25/72
374/5
5,118,945 A 6/1992 Winschuh et al.
(Continued)

FOREIGN PATENT DOCUMENTS

DE 102014002514 A1 8/2015
DE 102015205400 A1 9/2016
(Continued)

*Primary Examiner* — Mirellys Jagan
(74) *Attorney, Agent, or Firm* — Meunier Carlin & Curfman LLC

(57) ABSTRACT

The invention relates to an apparatus (1; 1a; 1b; 1c) and a method for determining a material property of a test specimen (5; 5a; 5b; 5c) in a test specimen region (6; 6a; 6b; 6c) near the surface, said apparatus comprising at least one electromagnetic radiation source (2; 2a; 2b; 2c) for irradiating at least one surface region (4; 4a; 4b; 4c) of the test specimen, and a detection device (8; 8a; 8b; 8c) for detecting thermal radiation (9; 9a; 9b) emitted by the surface region and/or for detecting radiation (31) reflected from the surface region (4; 4a; 4b; 4c) of the test specimen. An evaluation device (13; 13a; 13b; 13c) for ascertaining the material property to be determined on the basis of the emitted thermal radiation (9; 9a; 9b) and/or the reflected radiation (31) is expediently provided. Advantageously, it is possible for the material property to be determined particularly reliably and nondestructively.

15 Claims, 5 Drawing Sheets

(51) Int. Cl.
*G01N 21/88* (2006.01)
*G01N 25/72* (2006.01)

(58) Field of Classification Search
USPC .............................................. 374/43, 44, 57
See application file for complete search history.

(56) References Cited

U.S. PATENT DOCUMENTS

| | | | |
|---|---|---|---|
| 5,376,793 | A | 12/1994 | Lesniak |
| 6,399,948 | B1* | 6/2002 | Thomas ................. G01N 25/72 |
| | | | 250/341.6 |
| 2003/0229458 | A1 | 12/2003 | Alfano et al. |
| 2006/0153269 | A1* | 7/2006 | Lakestani .............. G01N 25/18 |
| | | | 374/E17.015 |
| 2006/0289766 | A1 | 12/2006 | DiMarzio et al. |
| 2008/0111074 | A1 | 5/2008 | Weir et al. |
| 2010/0100352 | A1* | 4/2010 | Thro ...................... G01N 25/18 |
| | | | 702/135 |
| 2013/0077650 | A1* | 3/2013 | Traxler .................. G01N 25/72 |
| | | | 374/5 |
| 2016/0245860 | A1* | 8/2016 | Schmidt ............. G01R 31/2635 |
| 2019/0287237 | A1 | 9/2019 | de Bonfim Gripp et al. |
| 2019/0360941 | A1 | 11/2019 | Ziltz et al. |

FOREIGN PATENT DOCUMENTS

| | | |
|---|---|---|
| EP | 2840408 A1 | 2/2015 |
| EP | 3457119 A1 | 3/2019 |
| WO | 2019094813 A1 | 5/2019 |

\* cited by examiner

APPARATUS AND METHOD FOR DETERMINING A MATERIAL PROPERTY OF A TEST SPECIMEN IN A TEST SPECIMEN REGION NEAR THE SURFACE

CROSS REFERENCE TO RELATED APPLICATIONS

This application is the U.S. national stage of International Application No. PCT/EP2020/085962, filed on 2020 Dec. 14. The international application claims the priority of LU 101529 filed on 2019 Dec. 12; all applications are incorporated by reference herein in their entirety.

BACKGROUND

The invention relates to an apparatus and a method for determining a material property of a test specimen in a test specimen region near the surface, said apparatus comprising least one electromagnetic radiation source for irradiating at least one surface region of the test specimen, and a detection device for detecting thermal radiation emitted by the surface region or for detecting radiation reflected from the surface region of the test specimen.

A process known as photothermics is known from prior art. A surface region of a substrate covered with a coating layer is irradiated with a laser, whereby said region is heated and, in particular, depending on a layer thickness and a coating material, thermal radiation is emitted which is detected by an infrared camera. The emission of the thermal radiation is time-delayed with respect to the irradiation with a phase shift d and an amplitude $I_D$. By determining d, the emitted thermal radiation and using known calibration curves, a thickness of the layer applied to the substrate in the irradiated surface region can be ascertained.

Furthermore, a method for non-destructive material testing is known from prior art in which a test specimen is irradiated with light of a specific wavelength and radiation reflected from the test specimen is detected by a detector. Deviations of a reflection pattern from a reference pattern can be used, for example, to detect a surface defect.

SUMMARY

An object of the present invention is to develop an apparatus as well as a method of the type mentioned above with which a specific material property of a test specimen in the test specimen region near the surface can be determined.

According to the invention, the object is achieved in that an evaluation device for ascertaining the material property to be determined on the basis of the emitted thermal radiation and/or the reflected radiation is provided.

DETAILED DESCRIPTION

The evaluation device enables a comparison of a reference signal with a measurement signal so that the material property can be ascertained. Advantageously, a particularly reliable and non-destructive determination of the material property is possible. Such an apparatus is for example used for quality management in automotive industry, preferably for testing a paint layer thickness or a quality of a paint layer applied to a car body.

A test specimen region near the surface is a region that extends into the test specimen and that is bounded by the irradiated surface region. For example, a test specimen may be a coated substrate or a structural element formed from steel that has a boundary layer with an increased carbon content compared to a structural component core due to carburization. The test specimen region near the surface in said cases would be the region extending into the test specimen where the material property is different from that of the structural component core or different from that of the substrate.

The radiation source is configured to generate electromagnetic radiation in a wavelength range from 50 nm to 50 µm, preferably between 200 nm and 15 µm. The wavelength of the radiation generated by the radiation source depends on the material of which the test specimen is made and also depends on its absorption capacity for radiation of said wavelength.

Possible radiation sources are light emitting diodes, preferably light emitting diodes emitting light with a wavelength between 780 nm and 2000 nm (near infrared), lasers such as a CO2 laser, a quantum cascade laser, a Nd-YAG laser, a radiant heater or a commercially available light source.

Material properties can be technical, chemical, physical, magnetic, thermal or thermophysical properties. A technical property of a material can be, for example, a roughness or a roughness distribution of a layer applied to a substrate.

Conceivably, the material property is a microstructural change in the test specimen region near the surface, for example due to carburization, nitriding or carbo-nitriding of a steel material, or a microstructural change caused by material fatigue.

Reflected radiation can for example be radiation from the radiation source reflected from the test specimen region near the surface, or radiation from a further radiation source, which can preferably be a laser, and with which the test specimen region near the surface is irradiated.

Conceivably, ambient light illuminating an environment in which an apparatus according to the invention is located is reflected.

It is expedient that the radiation source for irradiating the at least one surface region can be controlled in such way that its radiation can be frequency-modulated and/or intensity-modulated and is preferably configured for heating the at least one surface region. In an intensity modulation, the intensity of the radiation source with which the test specimen region near the surface is excited, i.e. irradiated, is periodically changed, for example sinusoidally or rectangularly. An excitation frequency is constant. For example, at a frequency of 10 Hz, the test specimen region near the surface would be excited identically 10 times per second.

In a frequency modulation, an intensity-modulated radiation source used to excite the test specimen region near the surface is additionally varied in its excitation frequency, for example with a continuous variation in frequency from 10 Hz to 1000 Hz in a time interval of for example 10 seconds.

It is conceivable that the frequency change occurs in discrete steps.

It is also conceivable that the radiation source is controlled with a signal formed by superposition of several discrete modulation frequencies, for example by superposition of fundamental and harmonic waves (multi-frequency method). In the multi-frequency method, a continuous intensity modulation of several frequencies is performed simultaneously.

In addition, it is conceivable that the test specimen region near the surface is excited in a pulse-like, intensity-modulated manner, for example with a flash. Such a radiation pulse would be a superposition of many excitation frequencies.

A penetration depth of a heat wave caused by irradiation with the electromagnetic radiation source into the test specimen region near the surface depends on the irradiation frequency, i.e. the excitation frequency of the radiation source. Low irradiation frequencies cause a high penetration depth, higher irradiation frequencies a lower penetration depth.

Frequency modulation makes it for example possible to determine properties of single layers of a multilayer coating, since each single layer can for example be excited by a specific frequency and an evaluable measurement signal can be acquired for each individual layer or each frequency.

Preferably, a number of said single layers corresponds to a number of discrete frequencies from which an excitation signal used to control the radiation source is generated by superposition.

In one embodiment of the invention, a means for spatial and/or temporal intensity modulation of radiation generated by the radiation source is provided, said means preferably comprises a controllable liquid crystal display and/or a diffractive optical element. A diffractive optical element (DOE) may be used for adjusting a beam geometry of a light beam.

The diffractive optical element (DOE) can be passive or active. A passive diffractive optical element can be designed as an optical grating with constant spacing between adjacent grating slits, while an active diffractive optical element can be controlled and is for example designed as a spatial light modulator (SLM). Electronic control (EASLM) or optical control (OASLM) of said spatial light modulator is conceivable.

Preferably, the spatial and/or temporal modulation means comprises a liquid crystal display (LCD) which is positioned in the optical path between the radiation source and the at least one surface region and by whose pixel-by-pixel control an adjustable temporally and spatially variable excitation pattern can be projected onto the surface region. A region to be tested within said surface region can be excited, for example to save computing power required for the evaluation of a measurement signal. By using of a liquid crystal display, an intensity- and/or frequency-modulated excitation of the test specimen region near the surface is conceivable. In addition, spatially modulated excitation is conceivable.

Combinations of said three types of excitation are conceivable.

For intensity and/or frequency modulated irradiation, the radiation transmittance of single pixels of the liquid crystal display would be changed over time.

For spatially modulated irradiation, some regions of the liquid crystal display would be switched to be transparent to said radiation and other regions to be opaque. The application of specific measurement patterns to the test specimen is conceivable.

The detection device has a matrix-shaped sensor field which is configured for a point-by-point detection of thermal radiation emitted by the at least one surface region or for a point-by-point detection of radiation reflected from the at least one surface region. The sensor array may be a component of an infrared (IR) or bolometer camera. Each pixel of the camera is formed by a sensor and a resolution of the camera corresponds to a number of vertical and horizontal sensors. Since the at least one surface region is recorded pixel by pixel, the material property within the surface region can advantageously be ascertained particularly precisely. Changes in the material property within the surface region can also be detected and can be displayed graphically, for example on a display screen.

The detection device is for example designed as a bolometer camera. Advantageously, an apparatus is created which has a particularly inexpensive detection device, which is in particular less expensive than an IR camera.

Another possible design is a pyroelectric camera, i.e. a camera whose pixels are formed by pyroelectric sensors.

In a further embodiment of the invention, each sensor of a matrix-shaped sensor field of the detection device is designed as a bolometric detector, a thermocouple or a semiconductor-based detector. A bolometric camera is advantageously particularly compact and is therefore especially suitable for mobile use of an apparatus according to the invention.

In a further embodiment of the invention, the evaluation device comprises a means for amplifying a measurement signal detected by the detection device, preferably at least a lock-in amplifier. A lock-in amplifier is a particularly narrow-band bandpass filter through which a particularly good signal-to-noise ratio is possible. Even weak measurement signals can be advantageously detected and evaluated. A very precise determination of the material property is possible.

For this purpose, a reference signal is correlated with a measurement signal, for example by a cross-correlation, whereby a phase shift d as well as an amplitude $I_D$ can be determined, on the basis of which the material property can be ascertained by comparison with reference values or curves.

The reference signal can be an intensity-modulated excitation signal used to control the radiation source, and the measurement signal can be a signal detected by the detection device, for example a heat or reflection curve over time in the at least one surface region detected by an IR or bolometer camera.

It is conceivable that a phase shift d and an amplitude $I_D$ are determined by a Fourier transformation or a so-called Goertzel algorithm.

In one embodiment of the invention, the amplification means is configured to amplify the measurement signal of each sensor of a matrix-shaped sensor field of the detection device, which is designed in particular as a bolometer camera. Advantageously, a pixel-by-pixel, i.e. pixel-wise, determination of material properties within the at least one surface region is possible. For each pixel, a material property is determined by the evaluation device and can be displayed graphically to a user of the apparatus, for example on a display screen, whereby deviations from a reference value can be displayed in particular in color.

Gray scale and/or false color representations are conceivable.

In a further embodiment of the invention, the apparatus is configured for determining thermophysical properties in the test specimen region near the surface, a layer thickness, a roughness of a layer, in particular a paint layer, thicknesses of single layers of a multilayer coating, a material hardness of the material forming the test specimen in the test specimen region near the surface, a hardening depth in the test specimen region near the surface and/or for determining and localizing defects in the test specimen region near the surface. Defects can for example be corrosion spots or locations where delamination of single layers of a composite material occurs. It is conceivable that defects are formed as inclusions or undesirable structural changes, for example due to material fatigue.

Thermophysical properties are, in particular, a thermal conductivity as well as a heat capacity of the test specimen in the test specimen region near the surface.

The radiation source, the detection device and/or the evaluation device is or are arranged in a stationary manner or is or are movable relative to the test specimen. Advantageously, a flexible use of the device is possible. Material properties of differently shaped test specimens can be determined with a single apparatus.

The radiation source may for example be attached to a gripper of an industrial robot and guided over a surface of a test specimen.

It is also conceivable that the radiation source, the detection device and/or the evaluation device are designed to be interchangeable. Advantageously, a modular design is possible.

For extension of an existing system, individual modules can be acquired additionally, an exchange of the entire apparatus for a new use is not necessary.

Further advantageously, a particularly large surface, for example a painted motor vehicle body, can be divided into several surface regions for determining a paint layer thickness, which surface regions are combined to form a particularly high-resolution paint layer thickness distribution.

BRIEF DESCRIPTION OF THE DRAWINGS

Embodiments of the invention are to be explained in more detail below on the basis of examples with reference to the non-limiting figures. It is shown.

DETAILED DESCRIPTION OF THE PREFERRED EMBODIMENTS

Figure 1:
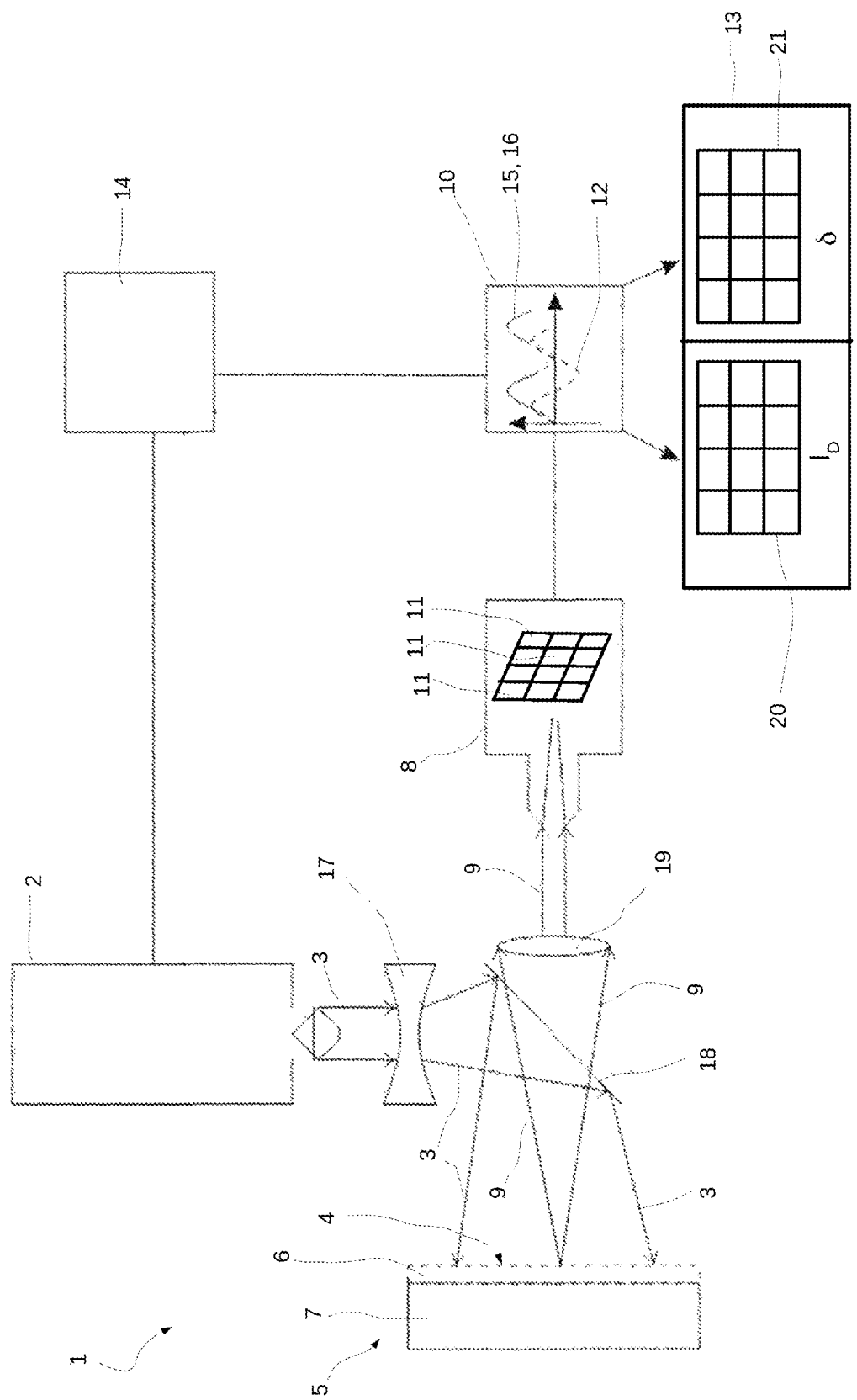
FIG. 1 an embodiment of an apparatus according to the invention.

An apparatus (1) shown schematically in FIG. 1a comprises a controllable radiation source (2) having light-emitting diodes for irradiating (3) a surface region (4) of a test specimen (5) which comprises a substrate (7) covered with a layer (6), a bolometer camera (8) for detecting thermal radiation (9) emitted by the surface region (4), a multi-channel lock-in amplifier (10) for amplifying a measurement signal (12) detected by the bolometer camera (8) in each pixel (11), and an evaluation device (13) which is configured to determine a layer thickness distribution in the surface region (4) and to display it graphically.

The apparatus (1) further comprises an AC voltage source (14) provided for intensity-modulated control (15) of the radiation source (2) and for supplying a reference signal (16) to the lock-in amplifier (10). In this embodiment, the reference signal (16) and the control signal (15) are identical and sinusoidal. Furthermore, the reference signal is the same for each pixel (11) of the bolometer camera (8) because the surface region (3) is uniformly irradiated by the radiation source (2).

Visible light (3) emitted from the radiation source (2) and intensity-modulated by the AC voltage source (14) passes through a lens (17) onto a beam splitter (18) and is directed toward the surface region (4) of the test specimen (5), heating the surface region (4) and emitting thermal radiation (9). The thermal radiation passes through the beam splitter (18) and a lens (19) and is detected by the bolometer camera (8), which in this embodiment has 1920×1080 pixels (11) arranged in a matrix. Each pixel is designed as a bolometric detector and is connected to an input channel of the multi-channel lock-in amplifier (10).

In each pixel (11) of the bolometer camera (8), a measurement signal (12) is generated, said measurement signal is correlated with the reference signal by the multi-channel lock-in amplifier (10) to determine both an amplitude $I_D$ of the measurement signal and its phase shift d with respect to the reference signal for each pixel (11).

A determination of an amplitude $I_D$ as well as the phase shift d by a Fourier transformation is conceivable.

The evaluation device (13) outputs a two-dimensional amplitude distribution $I_D$ (x,y) (20) and a spatial distribution of the phase shift d (x,y) (21) as a false-color or grayscale representation on a display screen not shown in FIG. 1.

If a thickness of the layer (6) is for example homogeneous in the surface region (3), a phase shift d (x,y) is the same for each pixel (11).

Although not shown in FIG. 1, it is conceivable that a coating thickness distribution is graphically displayed on a display screen. For its determination, reference values for the amplitude $I_D$ of the measurement signal and its phase shift d are stored in the evaluation device.

It is also conceivable that the surface region (4) is intensity- and frequency-modulated excited, i.e. irradiated.

Figure 2:
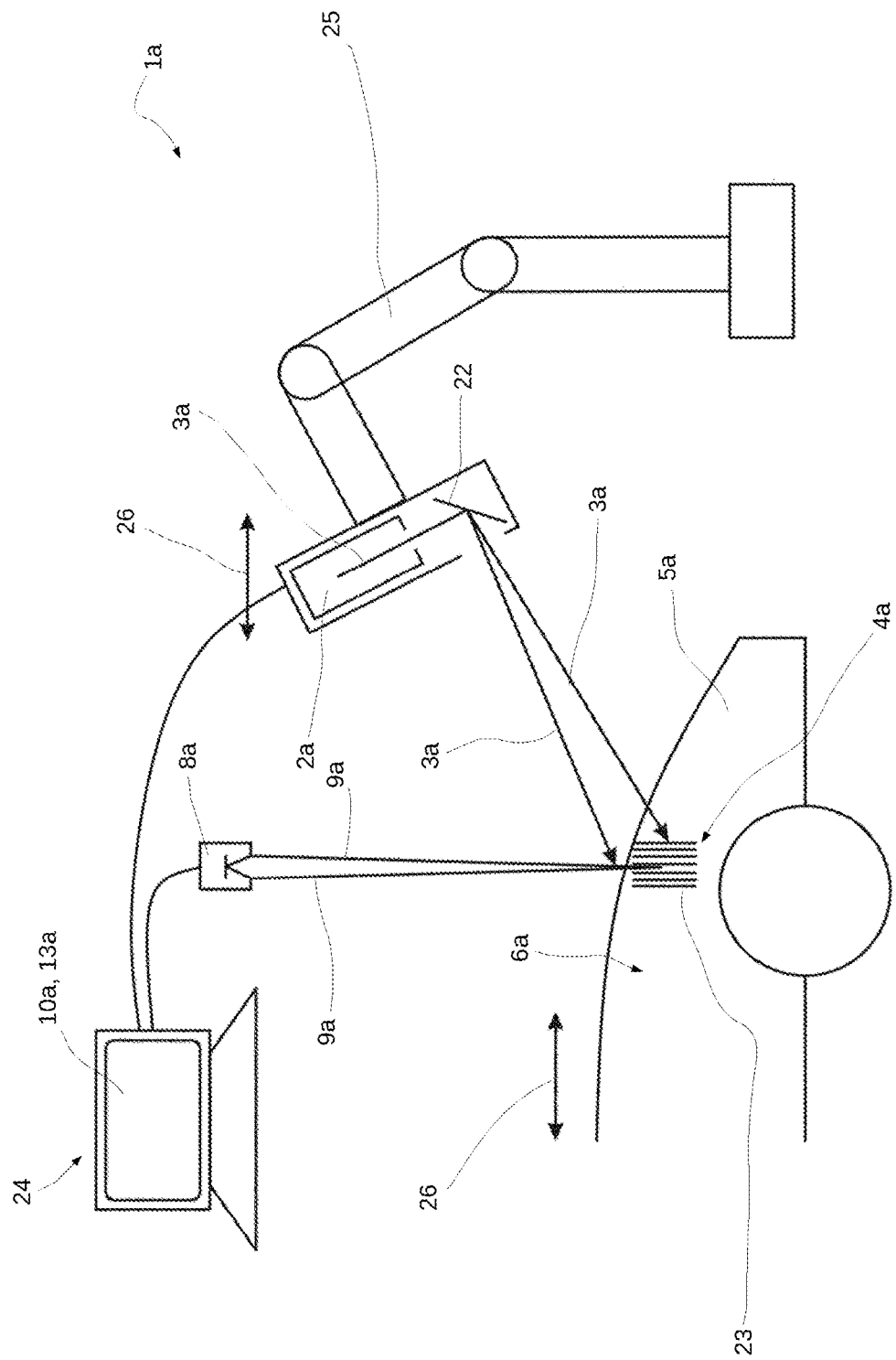
FIG. 2 a further embodiment of an apparatus according to the invention.

Reference is now made to FIG. 2, where identical or equal-acting parts are designated by the same reference number as in FIG. 1, and the letter a is added to the respective reference number.

An apparatus (1a) schematically shown in FIG. 2 for determining a paint layer thickness distribution on a motor vehicle body (5a) differs from that shown in FIG. 1 in that a controllable radiation source (2a) emits light (3a) which is modulated by a diffractive optical element (22) designed as a spatial light modulator (SLM) in such way that a surface region (4a) of the motor vehicle body (5a) is irradiated with adjacent, discrete lines (4b) and emitted thermal radiation (9a) is detected by a stationarily arranged bolometer camera (8a). A lock-in amplifier (10a) and an evaluation device (13a) are part of a computer (24) and are designed as software in this embodiment.

It is understood that a reference signal required for the lock-in amplifier (10a) is dependent on the control of the diffractive optical element (22).

The radiation source (2a) and the diffractive optical element (22) are attached to an industrial robot (25) and are movable in the direction of a double arrow (26). The motor vehicle body (5a) is also movable so that the stationarily arranged bolometer camera (8a) can detect a plurality of surface regions (4a) at different locations on the body (5a). It is conceivable that a frequency-, intensity- or spatially modulated irradiation (3a) is not performed by controlling a radiation source (2a), but by controlling the liquid crystal display (LCD). The radiation source (2a) can emit radiation continuously. Advantageously, inert radiation sources (2a) whose response time is longer than a required control time can be used.

A reference signal required for a lock-in amplifier (10a) in this case would be a control signal used to control the liquid crystal display.

Reference is now made to FIG. 3, where identical or equal-acting parts are designated by the same reference number as in FIGS. 1 and 2, and the letter b is added to the respective reference number.

Figure 3A:
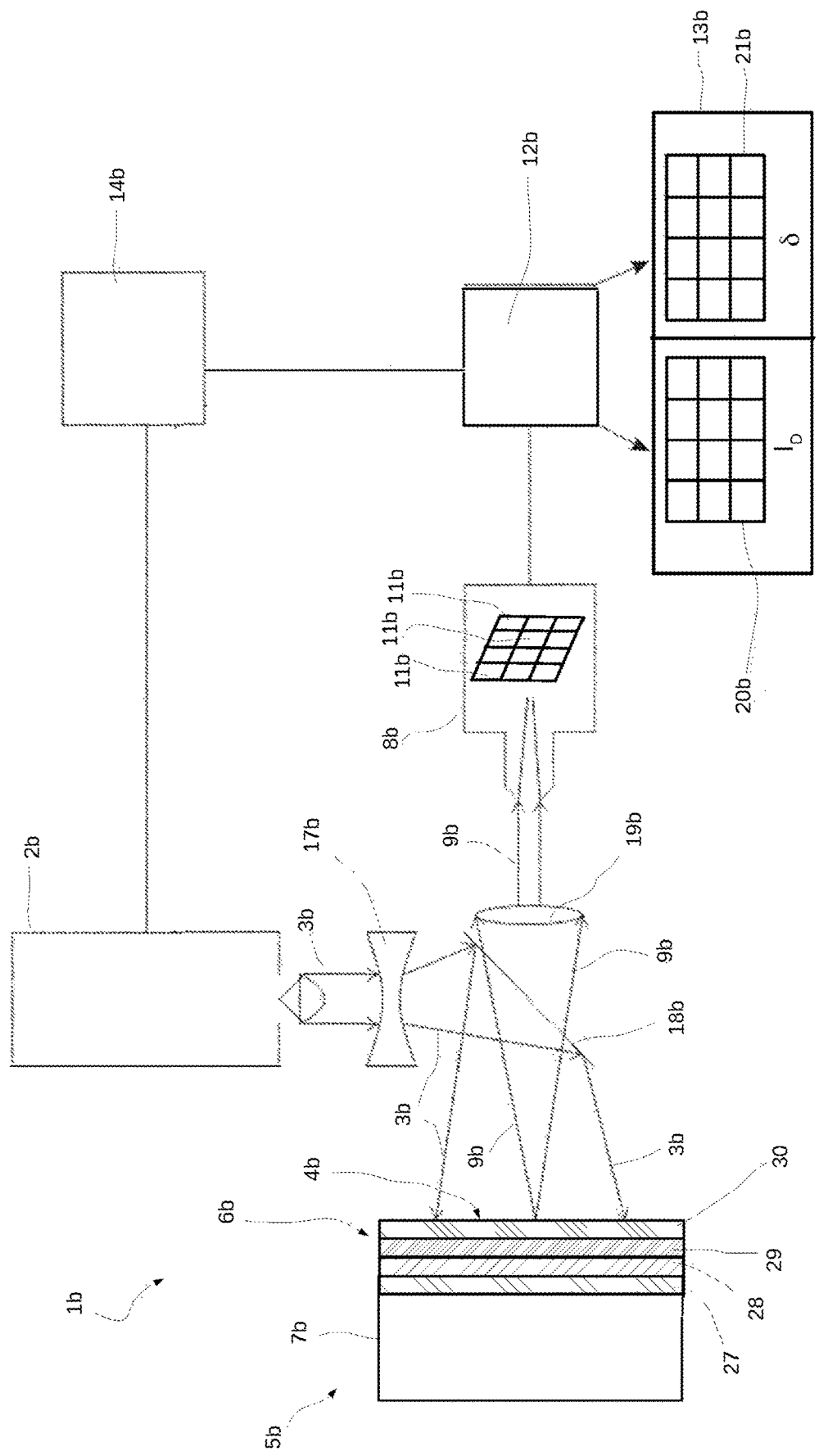
FIG. 3A a third embodiment of an apparatus according to the invention.

An apparatus (1b) schematically shown in FIG. 3A is designed for determining a thickness of single layers (27-30) of a four-layer coating (6b) applied to a substrate (7b).

Figure 3C:
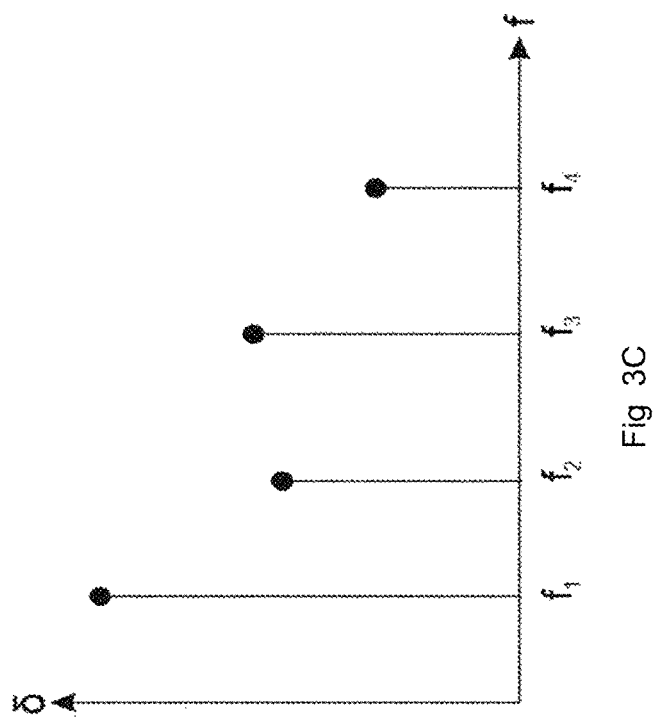
FIG. 3B a control signal (15b) is generated from superposition of four frequencies f1 to f4, FIG. 3C a phase shift d can be determined as a function of frequency, FIG. 4 a fourth embodiment of an apparatus according to the invention.
Figure 3B:
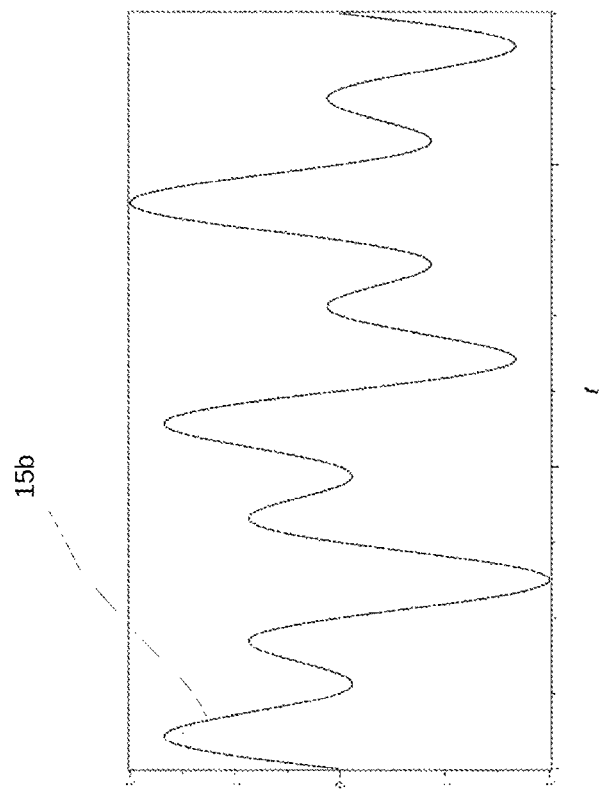

A radiation source (2b) is controlled by a multi-frequency method in which a control signal (15b) shown as an example in FIG. 3B is generated from superposition of four frequencies f1 to f4, where f1<f2<f3<f4.

By means of an evaluation device not shown in FIG. 3, a phase shift d shown in FIG. 3C can be determined as a function of frequency. By assigning a phase shift to one of the frequencies f1 to f4, the thickness of each of the layers (27-30) can be ascertained on the basis of reference curves.

Advantageously, the apparatus according to the invention and the method according to the invention enable a determination of thicknesses of individual layers of a multilayer coating with only one single measurement and a single apparatus.

Figure 4:
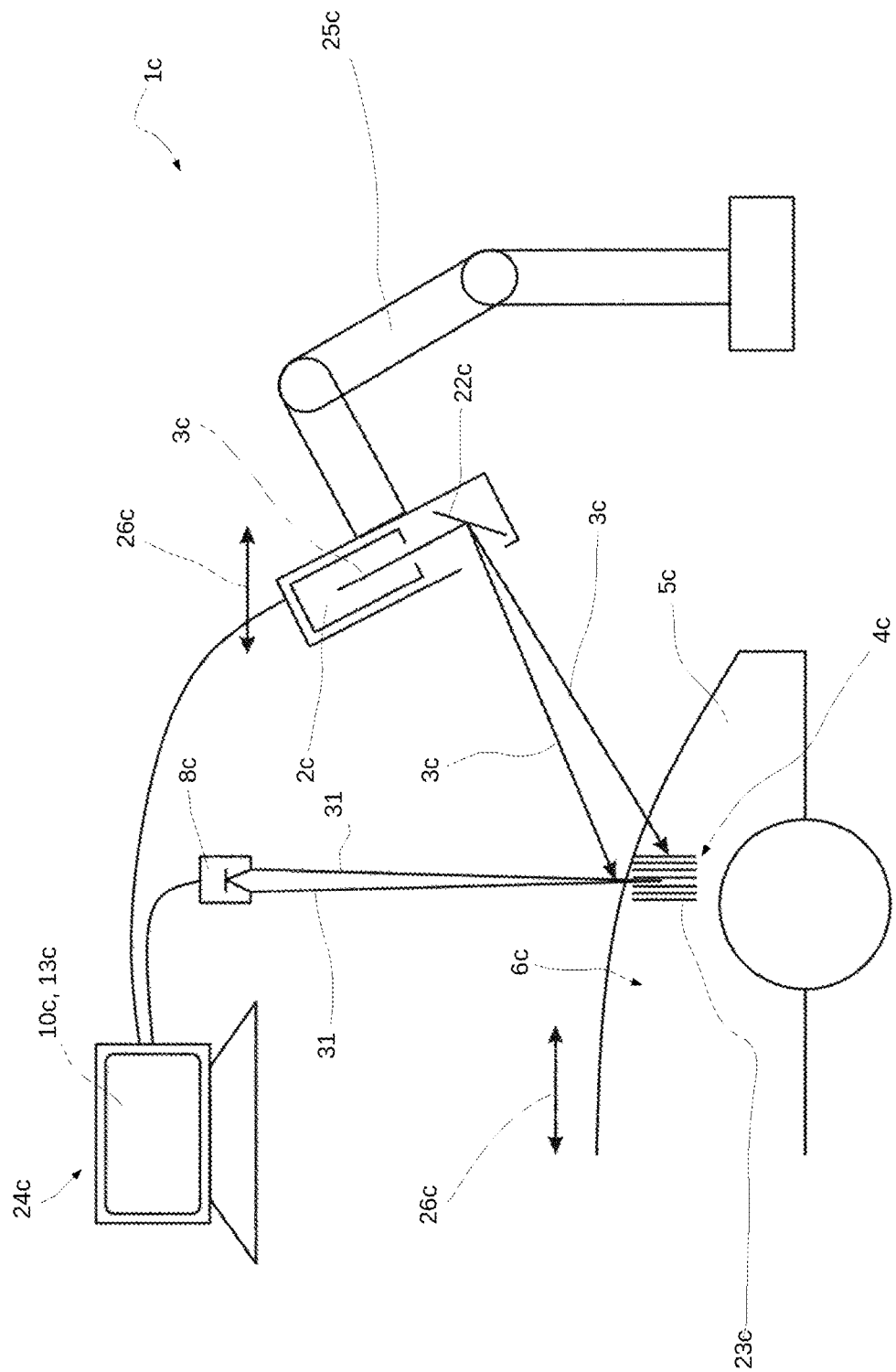

Reference is now made to FIG. 4, where identical or equal-acting parts are designated by the same reference number as in FIGS. 1 to 3, and the letter b is added to the respective reference number.

An apparatus (1c) shown schematically in FIG. 4 differs from that shown in FIG. 2 in that radiation (31) reflected from a surface region (4c) is used to determine air inclusions in a paint layer (6c) of a painted motor vehicle body (5c).

It is understood that all combinations of features of the embodiments shown in FIGS. 1 to 4 are conceivable.

The invention claimed is:

1. An apparatus for photothermal determination of a material property of a test specimen in a test specimen region near a surface of the test specimen, the apparatus comprising:
   at least one electromagnetic radiation source for heating at least one surface region of the test specimen,
   an AC voltage source providing intensity-modulated and frequency-modulated control of the at least one electromagnetic radiation source, wherein the at least one electromagnetic radiation source can be controlled so as to provide a frequency change that occurs in discrete steps,
   a detection device for detecting thermal radiation emitted by the at least one surface region and/or for detecting radiation reflected from the at least one surface region of the test specimen, and
   an evaluation device for ascertaining the material property to be determined on the basis of the emitted thermal radiation and/or the reflected radiation.

2. The apparatus according to claim 1, wherein the apparatus is configured for determining a thermophysical property in the test specimen region near the surface of the test specimen, a layer thickness of the test specimen, a roughness of a layer of the test specimen, a thickness of a single layer in a multilayer coating of the test specimen, a hardness of a material forming the test specimen in the test specimen region near the surface of the test specimen, a hardening depth in the test specimen region near the surface of the test specimen, and/or for determining and localizing a defect in the test specimen region near the surface of the test specimen.

3. The apparatus according to claim 1, wherein the at least one electromagnetic radiation source, the detection device, the evaluation device, or a combination thereof are arranged in a stationary manner relative to the test specimen.

4. The apparatus according to claim 1, wherein the at least one electromagnetic radiation source, the detection device, the evaluation device, or a combination thereof are movable relative to the test specimen.

5. The apparatus according to claim 1, wherein the detection device comprises a matrix-shaped sensor field that provides for a point-by-point detection of the thermal radiation emitted by the at least one surface region and/or that provides for a point-by point detection of the radiation reflected from the at least one surface region.

6. The apparatus according to claim 5, wherein each sensor of the matrix-shaped sensor field comprises a bolometric detector, a thermocouple, a semiconductor-based detector, or a pyroelectric sensor.

7. The apparatus according to claim 1, wherein the evaluation device comprises an amplifier for amplifying a measurement signal detected by the detection device.

8. The apparatus according to claim 7, wherein the detection device comprises a matrix-shaped sensor field, and wherein the amplifier amplifies the measurement signal of each sensor of the matrix-shaped sensor field.

9. The apparatus according to claim 7, wherein the amplifier comprises a lock-in amplifier.

10. A method for photothermal determination of a material property of a test specimen in a test specimen region near a surface of the test specimen, the method comprising:
    providing an apparatus that comprises:
        at least one electromagnetic radiation source for heating at least one surface region of the test specimen;
        an AC voltage source providing intensity-modulated and frequency-modulated control of the at least one electromagnetic radiation source, wherein the at least one electromagnetic radiation source can be controlled so as to provide a frequency change that occurs in discrete steps;
        a detection device for detecting thermal radiation emitted by the at least one surface region and/or for detecting radiation reflected from the at least one surface region of the test specimen; and
        an evaluation device for ascertaining the material property to be determined on the basis of the emitted thermal radiation and/or the reflected radiation
    positioning the test specimen such that the at least one surface region of the test specimen is operably coupled to the electromagnetic radiation source and the detection device;
    heating the at least one surface region of the test specimen with the electromagnetic radiation source;
    detecting the thermal radiation emitted by the at least one surface region and/or the radiation reflected from the at least one surface region of the test specimen with the detection device; and
    ascertaining the material property of the test specimen on the basis of the emitted thermal radiation and/or the reflected radiation with the evaluation device.

11. The method according to claim 10, further comprising moving the test specimen, the at least one electromagnetic radiation source, the detection device, or a combination thereof relative to one another.

12. The method according to claim 10, wherein the material property of the test specimen is graphically displayed to a user of the apparatus.

13. The method according to claim 10, wherein a change over time of a frequency at which the at least one surface region is heated by the radiation source is used by the evaluation device to determine a property of a single layer of a multilayer coating of the test specimen.

14. The method according to claim 10, wherein ascertaining the material property of the test specimen on the basis of the emitted thermal radiation and/or the reflected radiation with the evaluation device comprises determining an amplitude ($I_D$) and a phase shift (d) of a measurement signal.

15. The method according to claim 14, wherein the amplitude ($I_D$) and the phase shift (d) of the measurement signal are determined by a cross-correlation.

* * * * *